United States Patent
Savage

(10) Patent No.: US 6,442,687 B1
(45) Date of Patent: Aug. 27, 2002

(54) SYSTEM AND METHOD FOR SECURE AND ANONYMOUS COMMUNICATIONS

(75) Inventor: Colin Savage, New York, NY (US)

(73) Assignee: Ponoi Corp., New York, NY (US)

( * ) Notice: Subject to any disclaimer, the term of this patent is extended or adjusted under 35 U.S.C. 154(b) by 0 days.

(21) Appl. No.: 09/453,239

(22) Filed: Dec. 2, 1999

(51) Int. Cl.[7] .............................................. H04L 9/00
(52) U.S. Cl. ...................... 713/156; 713/200; 713/201; 709/203; 709/229
(58) Field of Search .............................. 380/277, 282; 713/150, 152–154, 171, 201, 155, 156, 200; 705/74; 709/203, 229

(56) References Cited

U.S. PATENT DOCUMENTS 5,909,491 A    6/1999  Luo
6,061,448 A  *  5/2000  Smith et al. ................. 380/282

OTHER PUBLICATIONS

Goldberg et al. Freedom Network 1.0 Architecture and Protocols, pp. 2–4, 18–21, Nov. 1999.*
Mark Grennan, "Firewall and Proxy Server HOWTO," http://www.grenna.com/Firewall–HOWTO.txt, vol. 70 Oct. 19, 1999, web site printout dated May. 25, 2000.
Michael K. Reiter and Aviel D. Rubin, "Crowds: Anonymity for Web Transactions," http://www.research.att.com/projects/crowds/, Technical paper link of AT&T Labs–Research, web site printout dated May 25, 2000.
Zero Knowledge, "Partner Programs, F.A.Q. (frequently asked questions)," http://www.zeroknowledge.com/partners/aip.asp, web site printout dated May 25, 2000.

* cited by examiner

Primary Examiner—Gail Hayes
Assistant Examiner—James Seal
(74) Attorney, Agent, or Firm—Hughes Hubbard & Reed LLP; Ronald Abramson; Sheryl L. Sandridge

(57) ABSTRACT

The invention provides secure and anonymous communications over a network, which is accomplished by imposing mechanisms that separate a users' actions from their identity. In one embodiment, involving use of the Internet, an http request, which normally contains both identity and action information, is separated in the first instance on the client side into action request and identity components, which are encrypted. The encrypted action and identity components are transmitted to a facility comprising an "identity server" and an "action server", wherein the identity server receives the two encrypted request components and forwards the encrypted action request component to an action server. The identity server has the key to decrypt the identity component (but not the action component), and the action server has the key to decrypt the action component (but not the identity component). The action server decrypts the action request and forwards it to the third-party server. The third-party server sends the http response back to the action server. The action server receives and encrypts the action response, and forwards it to the identity server. The identity server, which has been holding the unencrypted user identity information, receives the encrypted action response (which it cannot decipher), and forwards it to the client system, wherein the user's browser software uses the action response in the normal manner, so as to create the appropriate displays and/or multimedia output.

1 Claim, 10 Drawing Sheets

EXAMPLE INTERNET DIAGRAM

SESSION INITIALIZATION

REQUEST TRANSMISSION

RESPONSE TRANSMISSION

SESSION TERMINATION

SYSTEM AND METHOD FOR SECURE AND ANONYMOUS COMMUNICATIONS

BACKGROUND OF THE INVENTION

1. Field of the Invention

This invention generally relates to the field of communications and more particularly to systems and methods for providing anonymous and secure communications over a network.

2. Description of the Related Art

It is well known that individuals using telecommunications networks are continuously exposed to compromises of their privacy. This issue has become particularly acute with respect to the Internet. In many cases Internet hosts, service providers and Web sites can link users with their identities, and track and create databases of their activities. Voluntary privacy policies and related certification organizations such as Truste®) have imposed some limits on Internet privacy abuses, but do not by any means assure end user privacy or anonymity.

As shown in FIG. 1, a client system 100 is connected over a telecommunications link 110 to an Internet Service Provider (ISP) (not shown) and ultimately to the Internet 150. A Web server (Third-Party HTTP server 160) is connected over its own link 161 to the Internet 150. Properly addressed Internet Protocol (IP) packets may be exchanged over the Internet 150 between client 100 and Web server 160. FIG. 1A shows the layout of a typical IP packet, including a header 191 containing, among other information, a source address 192 and a destination address 193, as well as data portions, 194, 195, comprising, in this example, 452 "octets" (bytes) of data.

Client system 100 runs Web browser software 105 which establishes a display window visible to the user. Web browser 105 submits an http request 125 over the internet. The IP packet containing request 105 contains a header that is encoded with the IP address of client 100. Furthermore, Web server 160 may have previously given a "cookie" to client 100, containing information regarding the user of client 100. Information from this cookie may also be encoded as data within the IP request. Thus, when Web server 160 receives http request 125, it may acquire considerable identity information regarding the user, and will of course further have complete information about the action requested by the http request. The correlation of action and identity is particularly valuable to marketers, yet at the same time most threatening to users when in the hands or people out-side their confidence and control.

Web server 160 parses the http request, and processes it, serving up the Web page requested by the user, and/or conducting further processing via a "common gateway interface" (CGI) 185, which in turn may invoke further processing via scripts and programs 180, which may in turn communicate with databases such as database 190 and/or other facilities. The requested information is sent back to client 100 by http response 175, again encoded in addressed IP packets and sent to client 100 over the Internet 150. Web browser software 105 receives the http response 175 and from it creates the appropriate screen displays or multimedia effects for the end user.

The system commonly used in the prior art to provide some means of isolating an end user from total exposure to the Internet is known as a "firewall" or "proxy server". Proxy server 140 is shown in FIG. 1 as an optional addition to a prior art Internet communication system. Web browser software 105 is adjusted through a setup or configuration facility to direct and receive IP packets in the first instance from proxy server 140, instead of the usual router, gateway or similar facility of the ISP. Proxy server 140 can then intermediate, and thereby filter undesired or unacceptable input or output (which may be so deemed for any number of reasons, including security and censorship, in addition to privacy), and can also reconstruct IP packets so as to some extent mask the user's identity. However, the operator of the proxy serve can readily retrieve, and perhaps secretly misuse, any of this information. Therefore, to be effective, the end user must trust the administrator of the proxy server in question. In a commercial setting, and most particularly in a mass market setting, establishing and maintaining such trust in an entity may not be practicable.

Another set of privacy-related systems that has been deployed to a limited extent are "anonymous remailers". These use various techniques to separate the body of an email message from its identifying header and to resend it the intended recipient under the remailer's headers. The difficulty with such systems, such as the well-known remailer at anon.penet.fi in Finland, is that the server administrator has access to both the identity and content information, rendering it vulnerable to abuse or disclosure. In the case of anon.penet.fi, the disclosure was forced by a subpoena obtained by the Church of Scientology and enforced in Finland, which required the server administrator to hand over records of communications from a user that were the subject of a lawsuit by the Church against the user.

Other systems for protecting end user privacy have been developed. Typically such systems involve setting one or more proxies in series either locally on an end user's computer or on one or more servers. Such systems generally provide privacy protection by masking the identity of the sender from third party servers.

For example, one system, Crowds, which was developed by AT&T, enhances privacy by sharing http requests randomly among a group of subscribed users. With Crowds, although the identity of a request sender can trace the identity of a request sender to the group of users, the third party cannot be traced to any specific user.

The system disclosed here provides greater security than prior solutions. The system described here goes beyond masking the identity of the sender from third parties and masks the identity of the sender from both third parties and the system itself. This masking is accomplished by separating action from identity on the client computer. By way of comparison, while the Crowds system prevents third-parties from knowing the identities of senders, the Crowds system itself has the ability to know both the identity and actions of its users. The greater security provided by the system has the additional benefit of enabling more personal communications to be sent through the system. Because the system does not rely on removing identifying information for its functionality, end users can receive the benefits of identity protection without sacrificing the ability to act as individuals rather than anonymous entities.

BRIEF SUMMARY OF THE INVENTION

It is an object of the present invention to provide a system whereby, without relying on trust, an end user can securely and anonymously use communications networks. The invention seeks to provide users with a greater degree of anonymity than is available with existing technologies.

Other objects of the invention include the following:

A system that is secure. Both operational and cryptographic security are desirable. Cryptographic protocols employed in this project must preferably be both proven and "strong".

A system that does not record the actions of its users. The system should not be able to link the actions of users to the identities of users, though it may record either separately. This separation is a fundamental design objective in providing personal and portable privacy protection.

A system that functions in a reliable manner. Operation should be consistent and, in the event of failure, the system should notify its users and terminate without interfering with other functioning processes on its host computers.

A system that reduces the need for user interaction. Preferably, the services provided by the system should be transparent to its users Preferably, a system that functions without the persistent installation of software on client computers, and is instead accessible from any compatible network computer or other access device.

Preferably, a system that functions on a wide variety of host platforms and architectures.

Preferably, a system that is able to accommodate a large number of concurrent users.

The foregoing and other objects of the invention are accomplished in an embodiment of the invention by imposing mechanisms on the client that separate users' actions from their identity. This separation provides the basic foundation from which individuals can then take control over manifestations of themselves that exist in digital form on networks.

In one embodiment, involving use of the Internet, an http request, which normally contains both identity and action information, is separated in the first instance on the client side into action request and identity components, which are encrypted. The encrypted action and identity components are transmitted to a facility comprising an "identity server" and an "action server", wherein the identity server receives the two encrypted request components and forwards the encrypted action request component to an action server. The identity server has the key to decrypt the identity component (but not the action component), and the action server has the key to decrypt the action component (but not the identity component). The action server decrypts the action request and forwards it to the third-party server. The third-party server sends the http response back to the action server. The action server receives and encrypts the action response, and forwards it to the identity server. The identity server, which has been holding the unencrypted user identity information, receives the encrypted action response (which it cannot decipher), and forwards it to the client system, wherein the user's browser software uses the action response in the normal manner, so as to create the appropriate displays and/or multimedia output.

The manner in which the invention achieves these and other objects is more particularly shown by the drawings enumerated below, and by the detailed description that follows.

BRIEF DESCRIPTION OF THE DRAWINGS

The following briefly describes the accompanying drawings.

DETAILED DESCRIPTION OF THE PREFERRED EMBODIMENT

Figure 1:
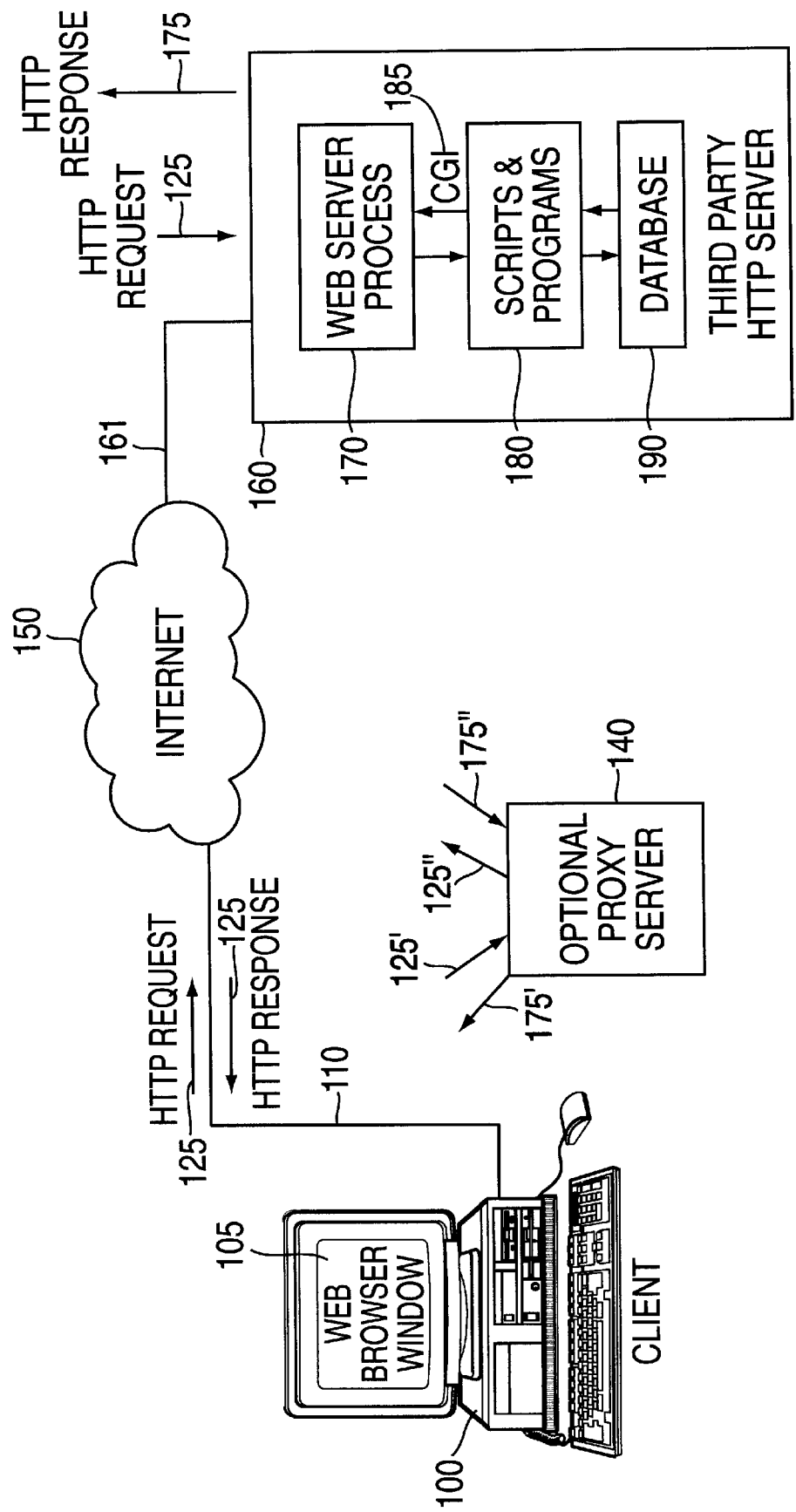
FIG. 1 shows a prior art system whereby Web browser software communicates over the Internet with a Web server, optionally through the intermediate means of a proxy server.
Figure 1A:
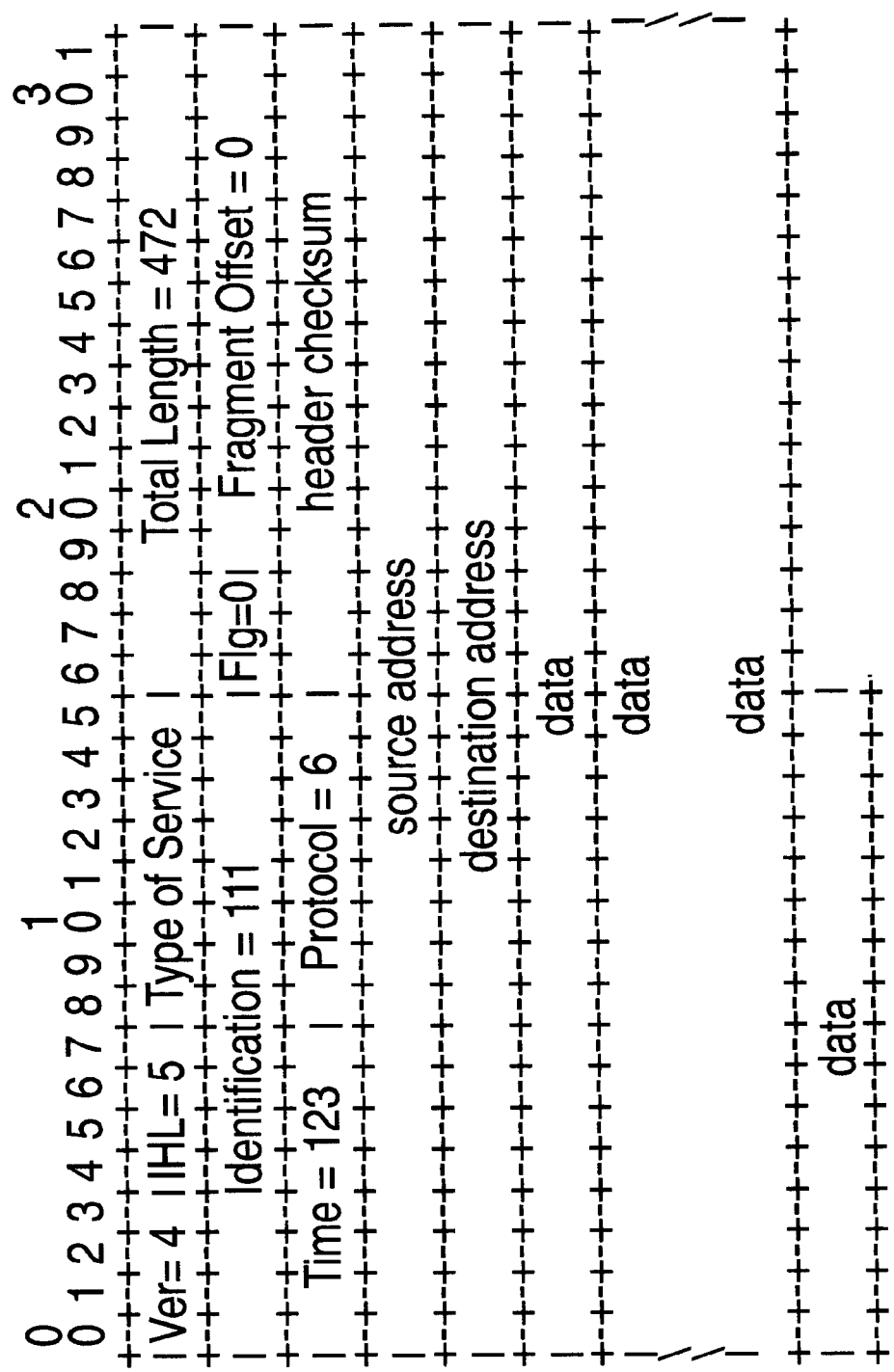
FIG. 1A shows the header and data layout of a typical IP packet as used over the Internet.
Figure 2:
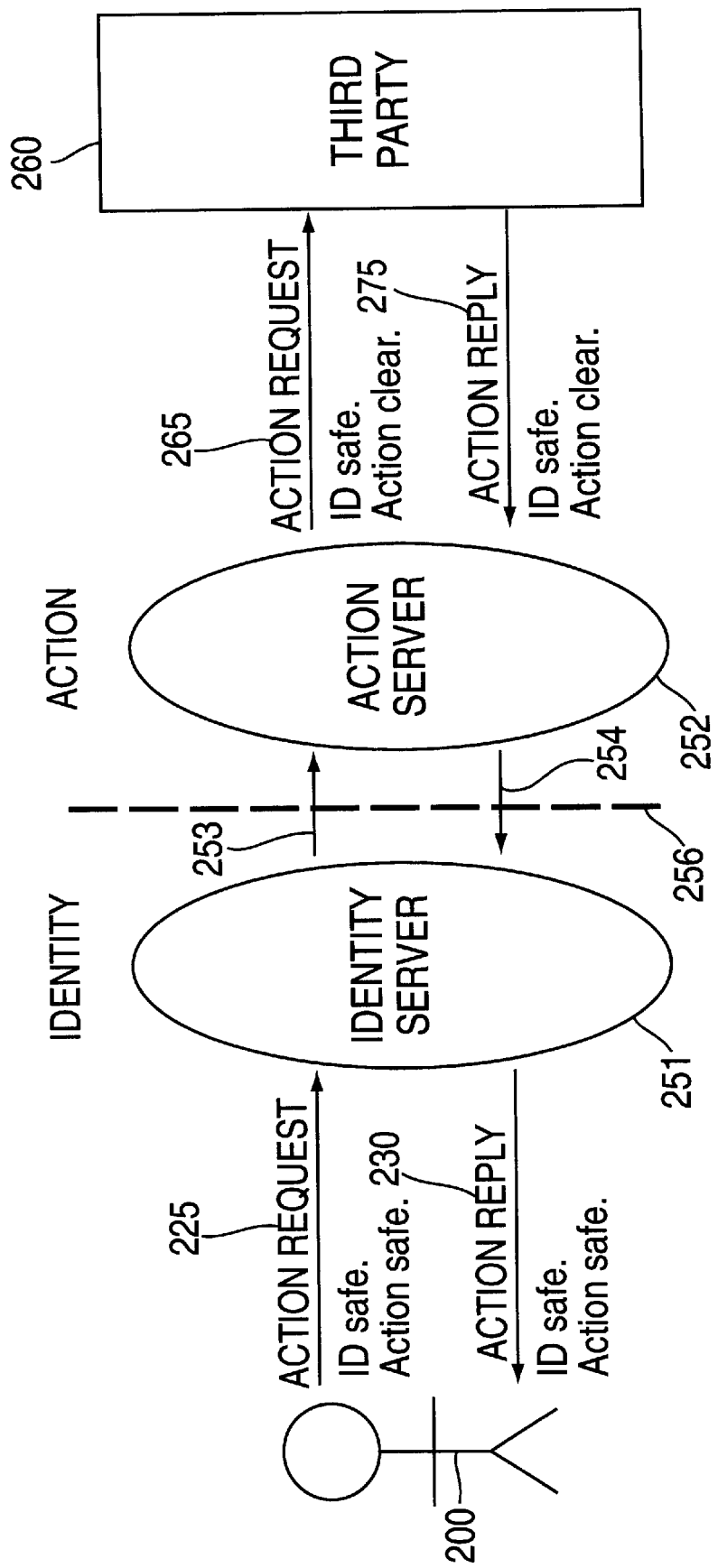
FIG. 2 is a block diagram showing the overall architecture of an embodiment of the invention.

The preferred embodiment of the invention is illustrated in FIGS. 2–10, and described in the text that follows. Although the invention has been most specifically illustrated with a particular preferred embodiment, its should be understood that the invention concerns the principles by which such embodiment may be constructed and operated, and is by no means limited to the specific configuration shown.

We first address issues of terminology. For purposes of this disclosure, we will take "anonymity" to mean the de facto separation of an entity's actions from its identity—and therefore from any distinguishing characteristics.

Further definitions used herein include the following:
HTML: Hypertext Mark-up Language
HTTP: Hypertext Transfer Protocol
MIME: Multimedia Internet Mail Extensions
IP: Internet Protocol (version 4)
JAR: Java Archive
JDK: Java Development Kit
JRE: Java Runtime Environment
SSL: Secure Socket Layer
URI: Universal Resource Identifier
URL: Universal Resource Locator
WWW: World Wide Web The preferred embodiment (sometimes referred to herein as the "system") consists of three major components that participate in relaying anonymous HTTP requests to a Web server via IP. In reading the following description, general reference should be made to FIGS. 2, 4, 5 and 6.

1. The first component of the system is a client application (for example, Java applet client 606) that acts as an HTTP proxy for a user's web browser soft-ware while they are connected to the system. This application is the only portion of the system that resides on client systems (such as client system 100) and will be communicated to those systems via the world-wide-web (for example, by ftp or http download from a server (not shown) associated with what is referred to in FIG. 6 as the "privacy" or "system" facility 300.

2. The second component is an identity server 251, which is part of privacy facility 300, that receives requests 225 from the client application and forwards them for further processing. The identity server 251 maintains the information required to transmit information back to a user for the duration of that user's HTTP session. Portions of a user's request 225 that contain information concerning the destination of that request—or that permit divination of the request—must never be accessible to the identity server.

3. The third and final component of the system is an action server 252 that performs HTTP requests on behalf of the system's users (e.g., user 200, etc.). The action server (252) must never have access to information that is specific to an individual user of the system, rather, it acts on behalf of the identity server 251 and return the results 275 of a user's HTTP request to the identity server 251 for transmission to the client.

The mechanism by which the identity server 251 is prevented from accessing information about the destination of an HTTP request and by which the action server 252 is prevented from accessing information about the source of a request is a communication protocol that employs public key cryptographic techniques. See generally, Rivets, et al., U.S. Pat. No. 4,405,829. By employing cryptographic techniques to guarantee that the preferred embodiment internally separates identity information from action information, we also guarantee that this separation is maintained on either side of the system facility 300. Because of this secure encryption, third parties monitoring network traffic going to or coming from any of the servers in the system facility, either legally or illegally, are never able to connect an action taken by the server to the identity of a user who is connected to the server. In addition, the persons administering such servers also do not have any means for making such a connection. Thus, it is not necessary for such administrators to be trusted by users of the system in order for such users to derive the security and anonymity benefits provided by the invention.

In the "privacy" or "system" facility referred to above, the identity server, action server and other elements thereof can be separate processes on a single machine or processor, processes on separate machines or processors. Such servers and other elements can be under the same administration or separate administration. The determination of such matters is not critical to the invention.

Rules

The system preferably functions in accordance with the following rules:

The action server 252 has full knowledge of individual's actions but no knowledge of individual's identity The identity server 251 has full knowledge of individual's identity but no knowledge of individual's actions The Java applet client 606 separates identity and action information Each of the action server 252, identity server 251 and Java applet client 606 have a unique pair of public-private keys The action server 252 and Java applet client 606 can communicate with one another only by passing encrypted requests through identity server Flow of Processing The flow of processing in the system is illustrated in FIGS. 7–10.

Session Initialization

Figure 7:
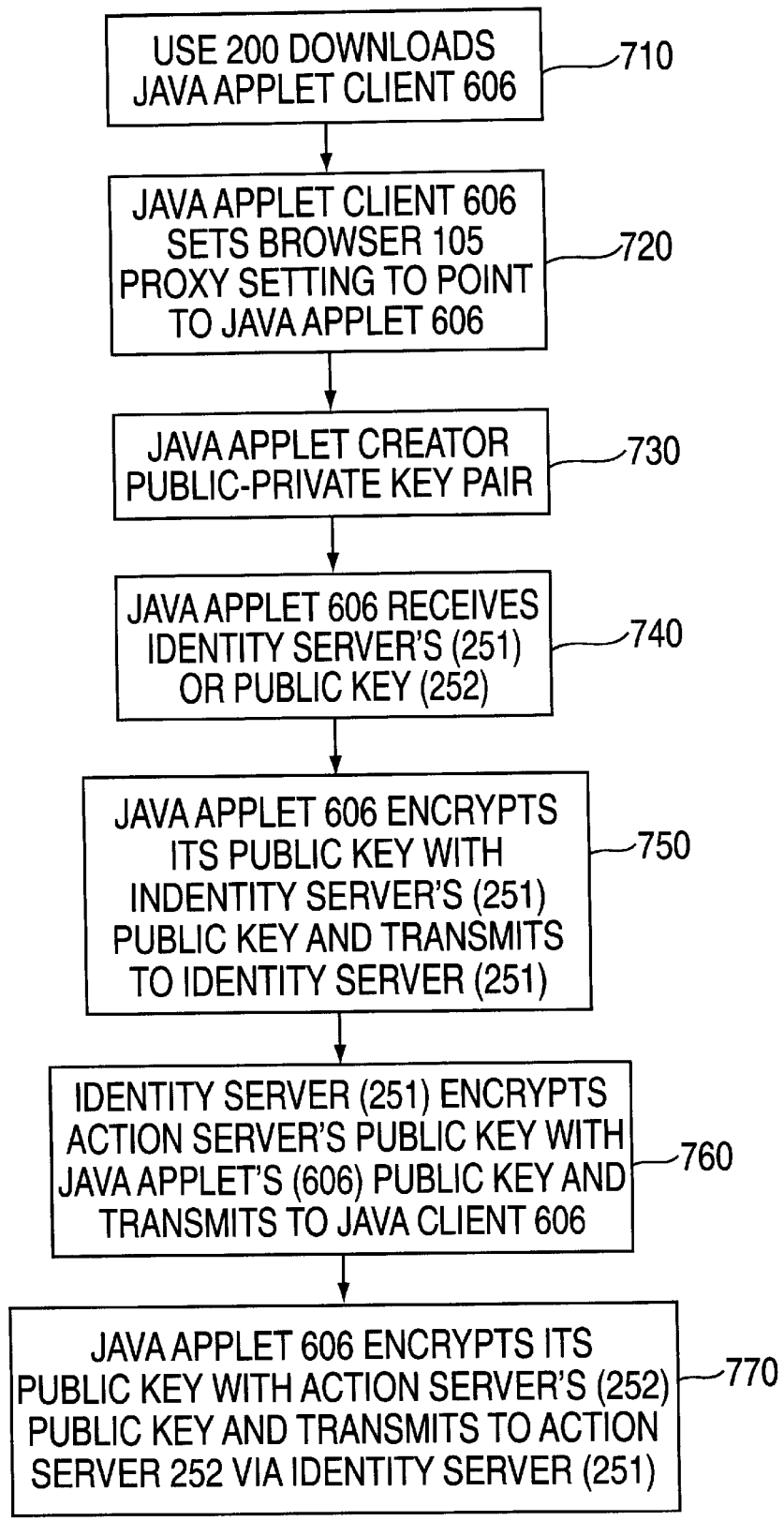
FIG. 7 is a flow chart showing the steps involved in the session initialization portion of the methods employed in connection with an embodiment of the invention.

As shown in FIG. 7, system initialization 710 begins when user 200 who is running a Web browser 105, downloads the code for Java applet client 600 from a server associated with the system facility 300. Next, 720, the Java applet client 606, running under Web browser 105, changes browser 105's proxy setting to direct http requests through the Java applet.

Then, 730, the Java applet client 606 creates public-private key pair.

In step 740, Java applet client 606 receives identity server's (251) public key.

In step 750, the Java applet client 606 encrypts its public key with the identity server's (251) public key and sends its public key, so encrypted, to identity server 251.

In step 760, the identity server 251 encrypts action server's (252) public key with the Java applet client's (606) public key, and sends action server's (252) public key, so encrypted, to Java applet client 606.

In step 770, Java applet client 606 encrypts its public key with the action server's (252) public key and sends its public key, so encrypted, to action server (252) via identity server 251.

Request transmission

Figure 8:
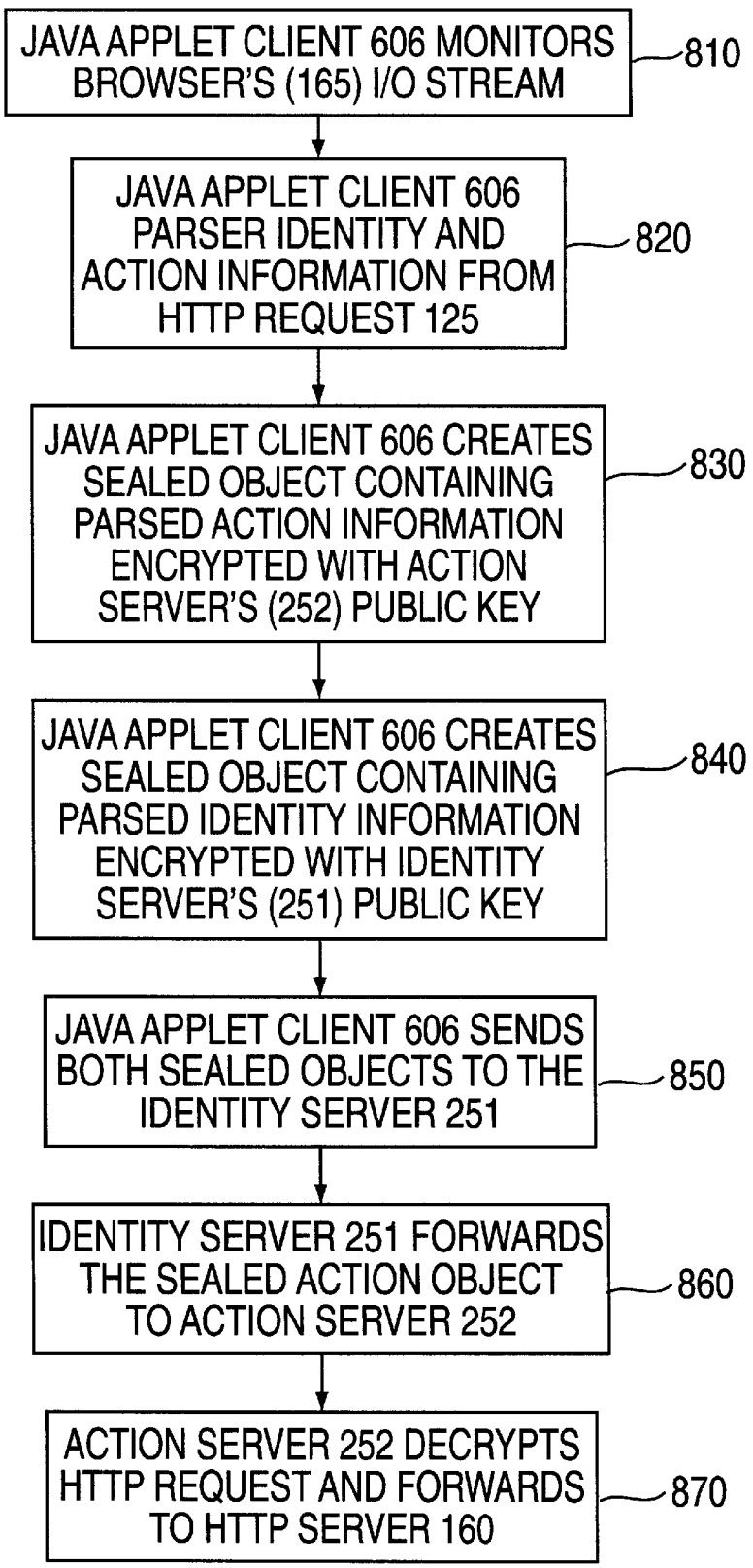
FIG. 8 is a flow chart showing the steps involved in the request transmission portion of the methods employed in connection with an embodiment of the invention.

As shown in FIG. 8, request transmission comprises the following steps:

In step 810, Java applet client 606 monitors the input-output streams from browser 105.

In step 820, when an http request 125 is sent by browser 105, Java applet client 606, which has been configured as such browser's http proxy, receives the request and parses it into separate identity and action information.

In step 830, Java applet client 606 creates a first sealed object containing the action information for the http request 125, encrypted with the action server's (252) public key.

In step 840, the Java applet client 606 creates a second sealed object containing the identity information for the http request 125 encrypted with the identity server's (251) public key In step 850, Java applet client 606 sends both sealed objects to the identity server 251.

In step 860, identity server 251 forwards the action sealed object to the action server 252.

In step 870, action server 252 decrypts action information for the http request and forwards it, preferably through another intermediate http proxy (not shown), to the destination third part server.

Response transmission

Figure 9:
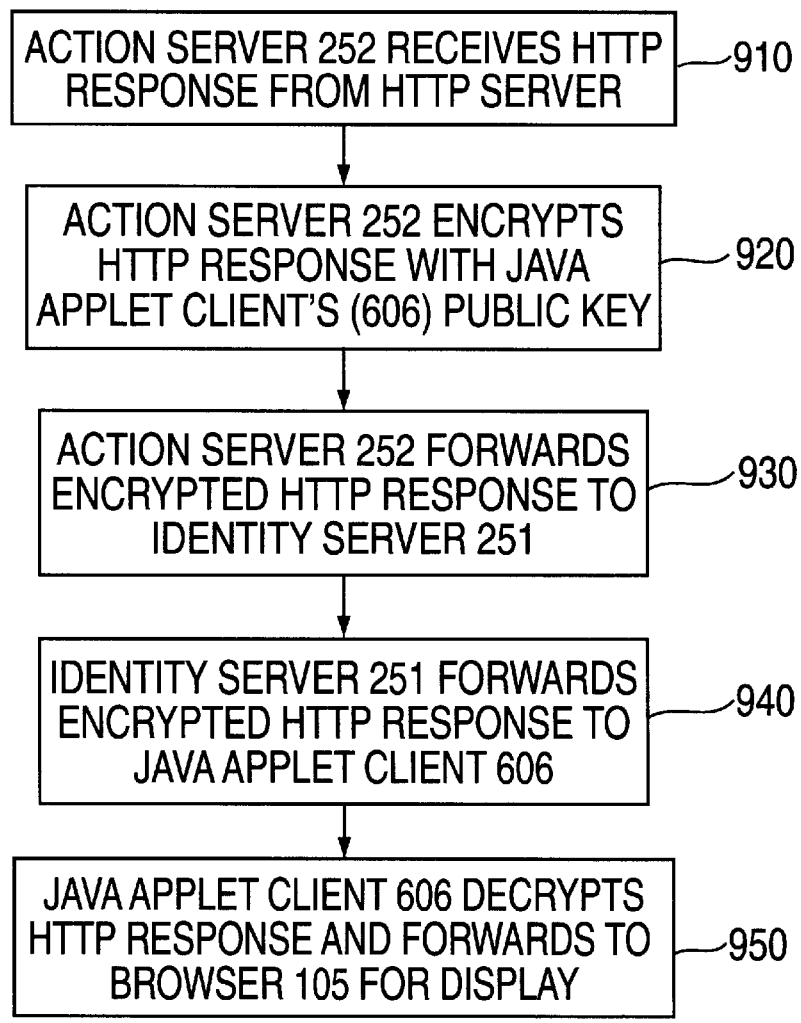
FIG. 9 is a flow chart showing the steps involved in the response transmission portion of the methods employed in connection with an embodiment of the invention.
Figure 10:
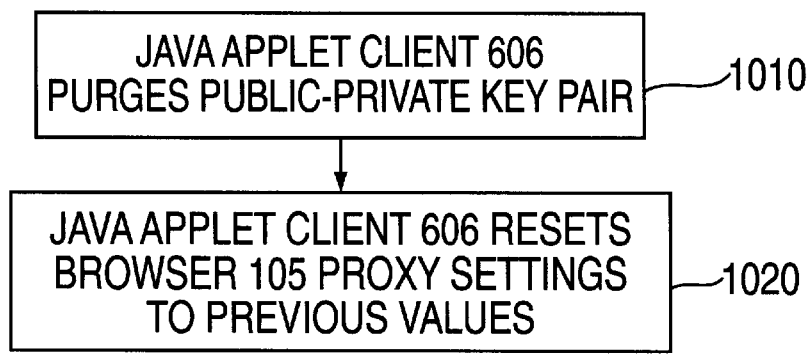
FIG. 10 is a flow chart showing the steps involved in the session termination portion of the methods employed in connection with an embodiment of the invention.

As shown in FIG. 9, response transmission comprises the following steps:

In step 910, the action server 252 receives http response 275 from the third-party server, preferably through said intermediate http server.

In step 920, action server 252 encrypts http response 275 with the Java applet client's (606) public key.

In step 930, action server 252 forwards encrypted http response 230 to identity server 251.

In step 940, identity server 251 forwards encrypted http response 230 to Java applet client 606.

In step 950, Java applet client 606 decrypts http response 230 and forwards it to browser 105 for display.

Session termination

As shown in FIG. 109, session termination comprises the following steps:

In step 1010, Java applet client 606 purges public-private key pair it has created.

In step 1020, Java applet client 606 resets browser 105 proxy settings to previous values.

Other Functionality

Figure 3:
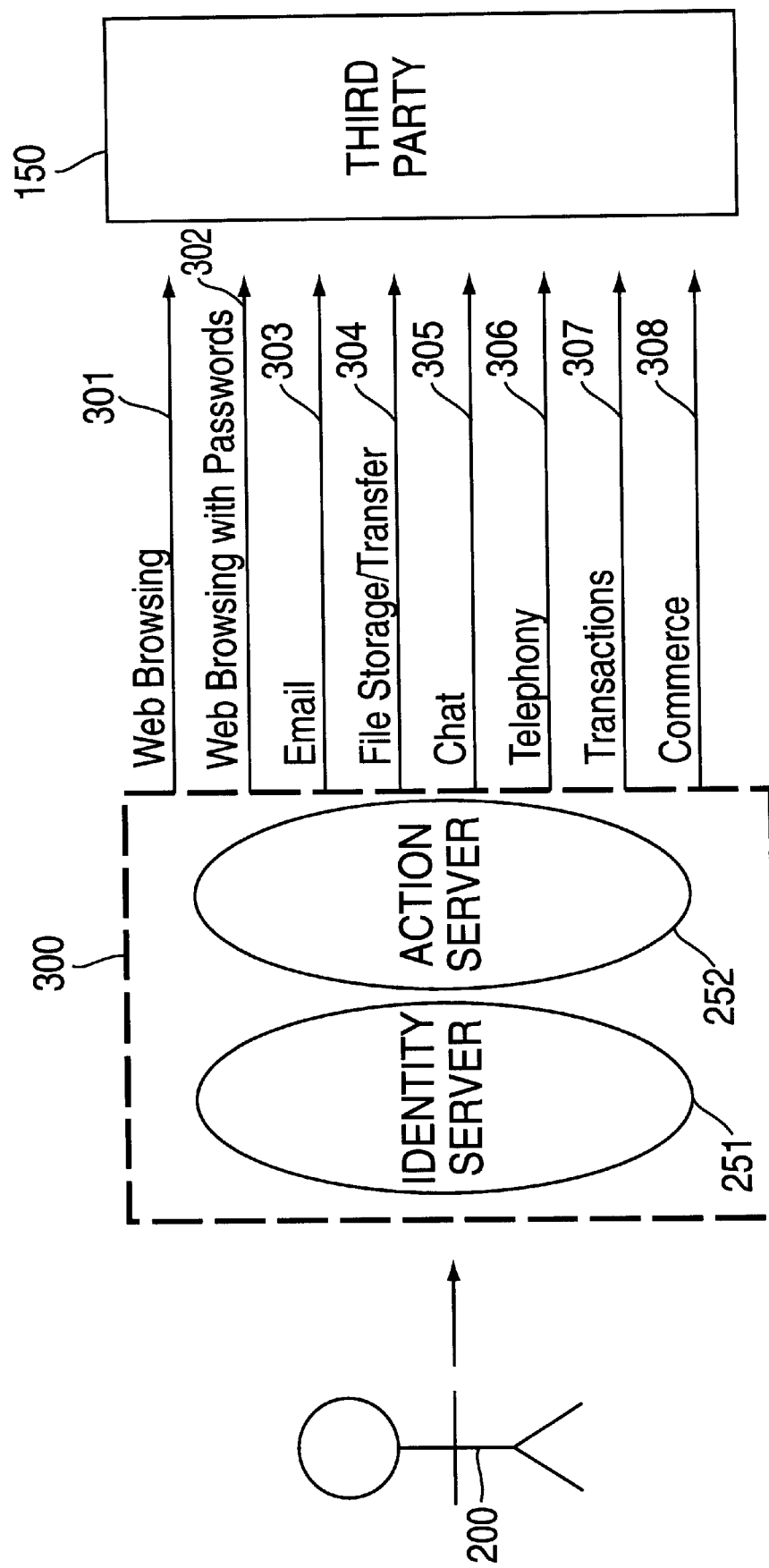
FIG. 3 is a diagram showing a range of additional functions that may be provided based in part on the technology of the present invention.
Figure 4:
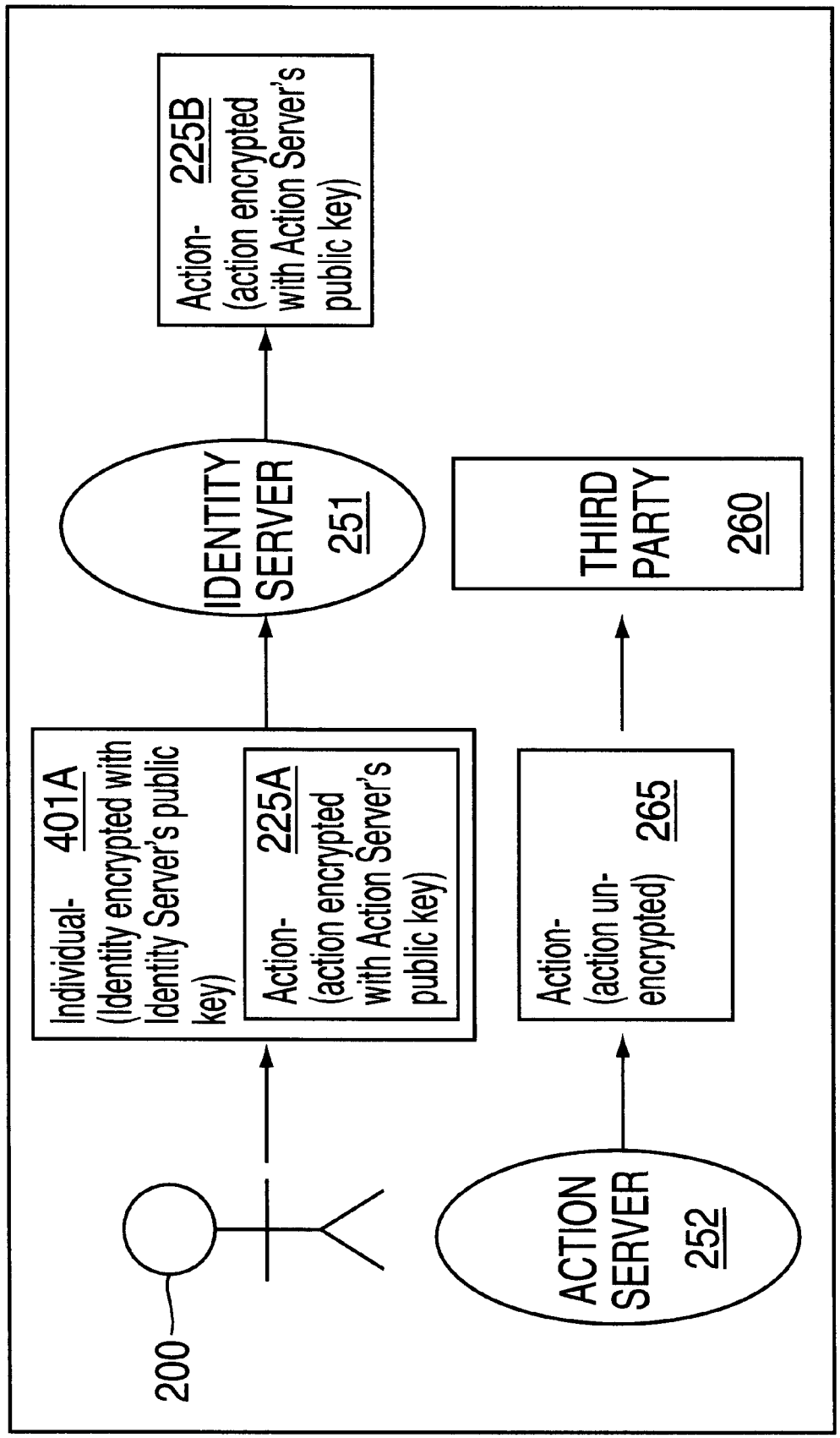
FIG. 4 is a block diagram showing the request transmission side of a transaction in accordance with an embodiment of the invention.
Figure 5:
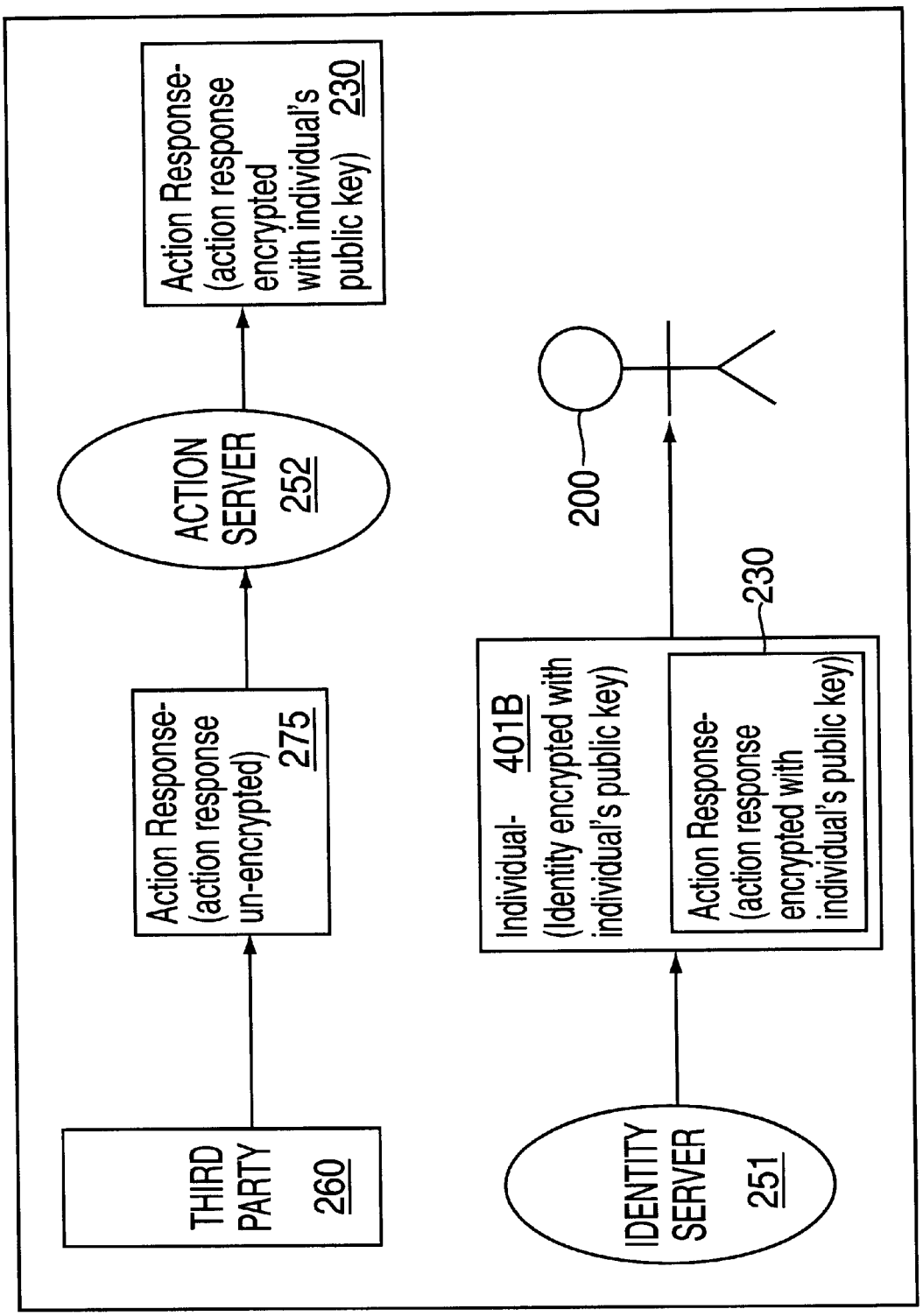
FIG. 5 is a block diagram showing the action response side of a transaction in accordance with an embodiment of the invention.
Figure 6:
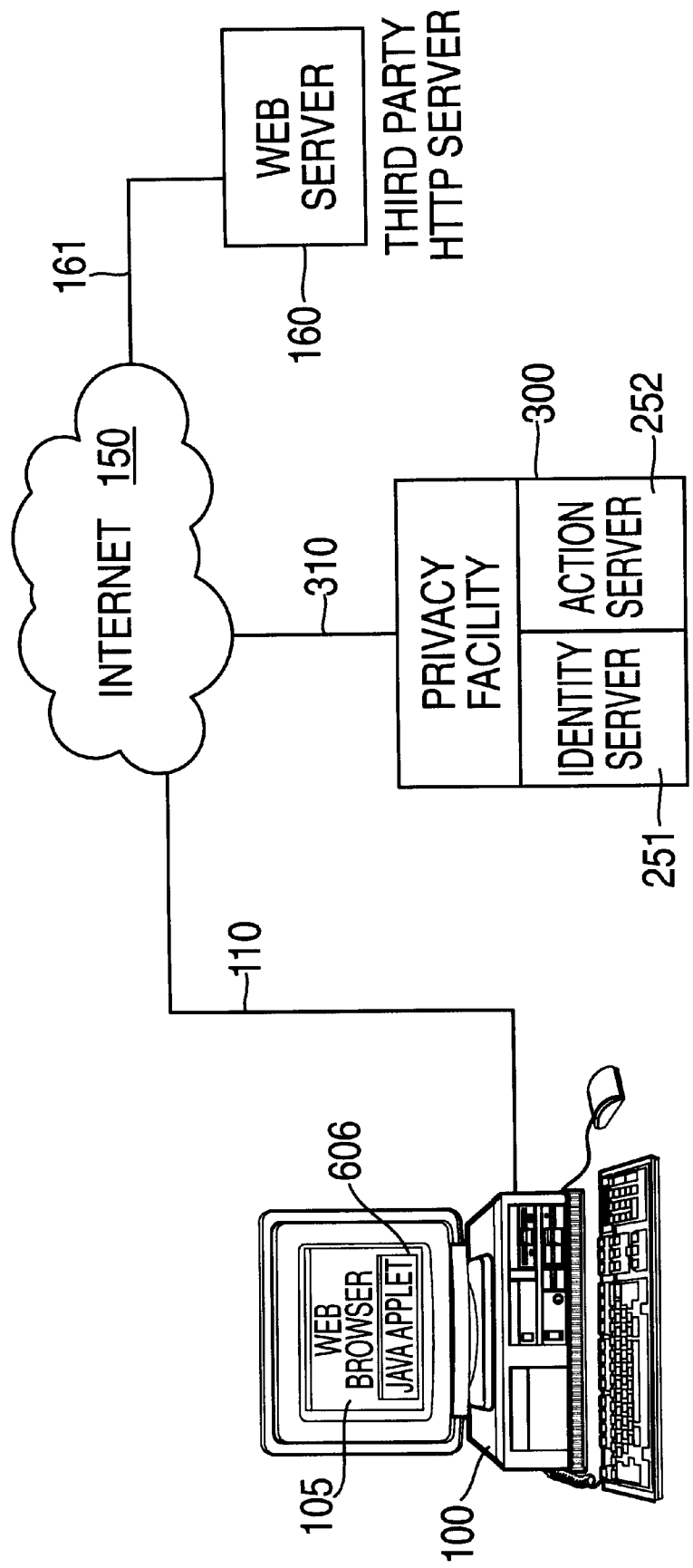
FIG. 6 is a block diagram showing the principal physical components utilized in connection with an embodiment of the present invention, and their interconnection over the Internet.

FIG. 3 reflects other functionality in addition to simple network navigation and Web browsing 301 that is provided in connection with the invention. Such functionality includes without limitation Web browsing with passwords 302, electronic mail 303, file storage and transfer 304, chat 305, telephony 306, transactions 307, and electronic commerce 308.

Further Description of System Components

What follows is a more detailed description of the various system components of the currently preferred embodiment and their operation.

Proxy Client

The proxy client of the preferred embodiment, a small footprint java applet 606, is the system component responsible for connecting end-users to the system. It functions as an HTTP proxy server and service HTTP requests from a user's web browser. Requests transferred through the system proxy client are encrypted and transferred to the identity server. Responses received by the proxy client from the action server via the identity server are decrypted and returned to a user's web browser.

Upon invocation from a known URL on the world-wide-web, the proxy client is loaded from a JAR file by a client web browser. Once loaded, the proxy client generates and/or retrieve the cryptographic data required to establish a secure communication channel with the system action server, and automatically configures the user's web browser to use the proxy client as a proxy server for browsing the world-wide-web (or alternately prompts the user to make this setting manually).

After receiving an HTTP request generated by a user's web browser, the proxy client establishes a secure connection to the identity server using the communication protocol discussed later in this disclosure. In the event of connection failure, the proxy client informs the user of the failure via a dialog box, and configuration changes to the user's web browser are reversed. Assuming a connection to the identity server can be successfully established, the proxy client filters all identifying information from the current HTTP request, removing HTTP header data or replacing header values with non-identifying defaults as necessary. The HTTP request is then be appended to any cryptographic data required for response transmission and both are be encrypted using the cryptographic protocol specified as part of the the system communication protocol (see Communication Protocol section below). Encrypted data is then be placed within a well formed the system protocol request, and the request is transmitted to the identity server.

Once a request has been sent from the proxy client to the identity server, the proxy client waits for a response. If a valid response is received, that response is be decrypted and returned to the user's web browser. Should the system fail to respond to a proxy client's request for a specified time-out interval, the proxy client aborts request processing and returns an error page to the user's web browser.

Server Architecture

Identity Server

Upon receiving a request from a web browser, the proxy client applet initiates a connection to the identity server. Once this connection is established the identity server reads the contents of an encrypted HTTP request from the proxy client. Should a valid request not be received within a specified time-out interval, the identity server 251 terminates the connection with the proxy client applet.

After receiving an encrypted client request, the identity server establishes a communication connection with the action server, and forward the request for further processing. In the event that a connection between the Identity and action servers cannot be established, the identity server terminates its connection with the proxy client applet. Once a connection is successfully established and those portions of the client request not related to the client's identity have been transferred, the identity server waits for a response from the action server. Again, in the event that a response is not received within a specified time-out interval, the identity server terminates its connection with the proxy client applet. Finally, valid response data received from the action server is forwarded to the proxy client applet, and all IP connections are terminated.

Action Server

The action server 252 is a background process that resides on a computer system associated with system facility 300. Its role is to execute HTTP requests on behalf of users of the system, and act as an end-point for the cryptographically secure communication channel by which data is transferred between the system's back-end facilities and its users. Once the identity server has received an HTTP request, a connection is established between the identity server and an action server residing on a different physical computer. This connection is used to forward the HTTP request to the action server where it is decrypted. After decryption, the clear text HTTP request is forwarded to a standard HTTP proxy server that retrieves the requested URL and returns it to the action server. Should the HTTP proxy fail to respond within a specified time-out interval, the action server terminates its IP connections with both the proxy server and the identity server. If a valid HTTP response is received by the action server, that response is encrypted using the cryptographic data provided along with the HTTP request, and the response is returned to the proxy client via the identity server.

Communication Protocol

Within the system, a single communication protocol is used to relay HTTP requests from the proxy client applet to the identity server and from the identity server to the Action Server. This protocol contains encrypted HTTP data augmented with a cryptographic key exchange mechanism and a minimal amount of control information. Two transmission formats are defined by this specification, the first for communication to the action server, and the second for communication by the action server.

Request Format

HTTP requests transmitted by the proxy client to the identity server for process- ing by the action server is formatted as follows:

TABLE 1

| Client Transmission Format | | |
|---|---|---|
| Clear text | Encrypted | |
| Header | Public Key | HTTP Request |

Each transmission consists of three distinct parts. The first is a 96-bit long clear text header block that contains control information for the transmission. The second and third portions are encrypted data blocks of variable length. The header is immediately followed by the proxy client's public key in order to permit responses from the action server to be encrypted for transmission to the proxy client. The HTTP Request received from a user's web browser follows the public key.

TABLE 2

| Client Header Format | | | |
|---|---|---|---|
| 8 | 16 | 24 | 32 |
| 'E' Protocol Version | 'D' Public Key Length | 'N' Public Key Length | 'T' HTTP Request Data Length |
| HTTP Request Data Length | HTTP Request Data Length | HTTP Request Data Length | End of Header Marker (0 × 00) |

Magic Cookie (bits 0–31): An identifier used to rapidly indicate a valid transmission. All components of the system shall terminate communications that do not begin with this sequence.

Protocol Version (bits 32–39): A number used to identify the version of the protocol for future compatibility. The version of the protocol used in the prototype implementation will be 0x01 (one).

Public Key Length (bits 40–55): Length of the encrypted client public key in bytes.

HTTP Request Data Length (bits 56–88): Length of the encrypted HTTP Request in bytes.

End of Header Marker (bits 89–96): The literal value 0x00 (zero) used to delimit the header and data portions of a transmission.

Response Format

HTTP responses transmitted by the action server to the proxy client are formatted as follows:

TABLE 3

| Server Transmission Format | |
|---|---|
| Clear text | Encrypted |
| Header | HTTP Response |

Each transmission consists of two distinct parts. The first is an 80-bit long clear text header block that contains control information for the transmission. The second portions is an encrypted data block of variable length containing the HTTP response for a client's request.

TABLE 4

| Server Header Format | | | |
|---|---|---|---|
| 8 | 16 | 24 | 32 |
| 'E' Protocol Version | 'D' HTTP Response Data Length | 'N' HTTP Response Data Length | 'T' HTTP Response Data Length |
| HTTP Response Data Length | End of Header Marker (0 × 00) | | |

Magic Cookie (bits 0–31): A unique identifier used to rapidly indicate a valid transmission. All components of the system shall terminate communications that do not begin with this sequence.

Protocol Version (bits 32–39): A number used to identify the version of the protocol for future compatibility. The version of the protocol used in the prototype implementation will be 0x01 (one).

HTTP Response Data Length (bits 40–72): Length of the encrypted HTTP Response in bytes.

End of Header Marker (bits 73–80): The literal value 0x00 (zero) used to delimit the header and data portions of a transmission.

It is apparent from the foregoing that the present invention achieves the specified objects of providing secure and anonymous use of a communications network, as well as the other objectives outlined herein. While the currently preferred embodiment of the invention has been described in detail, it will be apparent to those skilled in the art that the principles of the invention are readily adaptable to other implementations and system configurations and communications paradigms without departing from the scope and spirit of the invention, as defined in the following claims.

I claim:

1. A system for providing communications over a network, by means including at least a client and a remote server, wherein a user may submit a request through said client for a specified action to be performed in response to said request by said remote server, said user-submitted request comprising identity information that identifies the user making the request, and action information that specifies the action requested from said remote server by said user, and wherein said communications are provided in a secure and anonymous manner in that said action information is submitted to said remote server without revealing said identity information to said remote server, and in that only said client, and not any facility through which said action information or any response thereto passes in the course of being submitted to or received from said remote server, possesses both said identity information and said action information, said system comprising (in addition to said client and remote server):

a) an application that separates said identity information and said action information from the user's information request, encrypts said identity information and said action information, and sends said identity information and said action information as so encrypted to a first intermediate server;

b) said first intermediate server, which contains means for decrypting said encrypted identity information but not said encrypted action information, and for transmitting said encrypted action information to a second intermediate server;

c) said second intermediate server, which contains means for decrypting said action information, transmitting said decrypted action information to said remote server, receiving the remote server's response, encrypting said remote server response, and transmitting said encrypted remote server response to said first intermediate server;

d) said first intermediate server further having means for receiving said encrypted remote server response from said second intermediate server, associating said encrypted remote server response with said identity information and sending said encrypted remote server response to said application;

e) said application further having means for decrypting said remote server response and forwarding said decrypted remote server response to said client for presentation to the user.

\* \* \* \* \*